(12) United States Patent
Hayashi

(10) Patent No.: US 10,001,594 B2
(45) Date of Patent: Jun. 19, 2018

(54) LIGHTING DEVICE AND METHOD FOR MANUFACTURING THE SAME

(71) Applicant: NICHIA CORPORATION, Anan-shi, Tokushima (JP)

(72) Inventor: Tadao Hayashi, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 82 days.

(21) Appl. No.: 15/281,402

(22) Filed: Sep. 30, 2016

(65) Prior Publication Data

US 2017/0090101 A1    Mar. 30, 2017

(30) Foreign Application Priority Data

Sep. 30, 2015    (JP) .................................. 2015-193835

(51) Int. Cl.
*F21V 7/04*        (2006.01)
*F21V 8/00*        (2006.01)

(52) U.S. Cl.
CPC .......... *G02B 6/0055* (2013.01); *G02B 6/005* (2013.01); *G02B 6/0065* (2013.01); *G02B 6/0068* (2013.01); *G02B 6/0073* (2013.01)

(58) Field of Classification Search
CPC .... G02B 6/0055; G02B 6/005; G02B 6/0073; G02B 6/0068
See application file for complete search history.

(56) References Cited

U.S. PATENT DOCUMENTS

| | | | |
|---|---|---|---|
| 6,250,767 B1 | 6/2001 | Kusafuka et al. | |
| 8,755,005 B2* | 6/2014 | Bierhuizen | G02B 6/0021 |
| | | | 349/65 |
| 9,117,987 B2* | 8/2015 | Hayashi | H01L 33/60 |
| 2002/0131261 A1 | 9/2002 | Inui et al. | |
| 2007/0154199 A1 | 7/2007 | Chu | |
| 2010/0073597 A1 | 3/2010 | Bierhuizen et al. | |

(Continued)

FOREIGN PATENT DOCUMENTS

| | | |
|---|---|---|
| JP | 2000-009942 A | 1/2000 |
| JP | 2000286454 A | 10/2000 |

(Continued)

*Primary Examiner* — Evan Dzierzynski
(74) *Attorney, Agent, or Firm* — Hunton Andrews Kurth LLP

(57) ABSTRACT

A lighting device includes a light-emitting component including at least one light-emitting element mounted on a base, a light guide plate guiding light emitted from the light-emitting element, a wavelength conversion member partially covering the light guide plate, and a first reflective member covering the wavelength conversion member. The light guide plate comprises two main surfaces, which include a light-extraction surface allowing light emitted from the light-emitting element to exit and a rear surface opposite to the light-extraction surface. One of two main surfaces comprises at least one recess formed in an edge region thereof. The other main surface of the light guide plate includes a part covered by the wavelength conversion member and a part exposed from the wavelength conversion member. The light-emitting element is accommodated in the recess such that a light-emitting surface of the light-emitting element faces the wavelength conversion member.

16 Claims, 10 Drawing Sheets

(56) References Cited

U.S. PATENT DOCUMENTS

2015/0034987 A1  2/2015  Hayashi et al.
2015/0325756 A1  11/2015  Hayashi et al.

FOREIGN PATENT DOCUMENTS

| JP | 2002-096680 A | 4/2002 |
| JP | 2002141559 A | 5/2002 |
| JP | 2002-279817 A | 9/2002 |
| JP | 2005-085718 A | 3/2005 |
| JP | 2007184262 A | 7/2007 |
| JP | 2007207615 A | 8/2007 |
| JP | 2008108523 A | 5/2008 |
| JP | 2008-270786 A | 11/2008 |
| JP | 2010027229 A | 2/2010 |
| JP | 2012069324 A | 4/2012 |
| JP | 2015028997 A | 2/2015 |
| JP | 2015072501 A | 4/2015 |

* cited by examiner

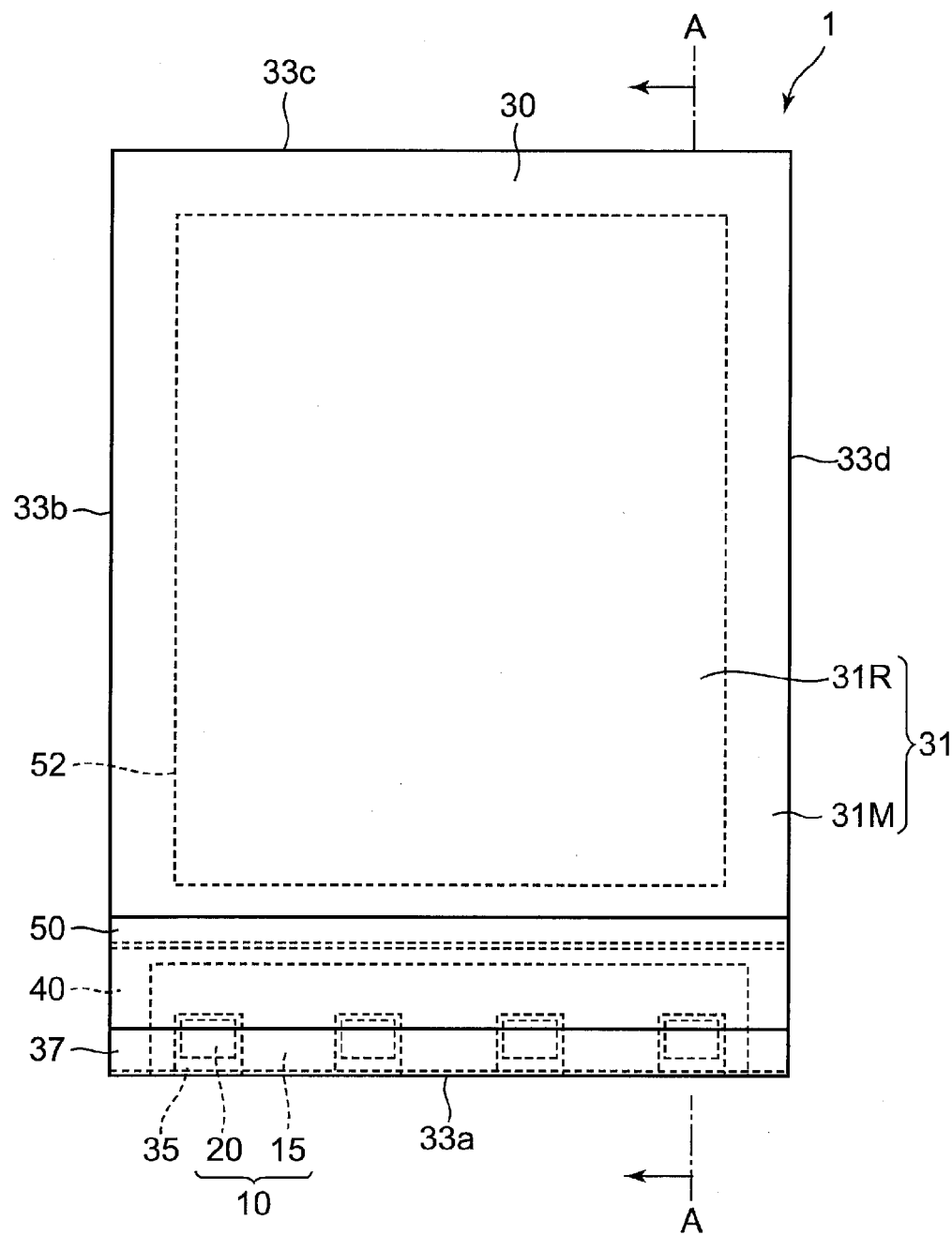

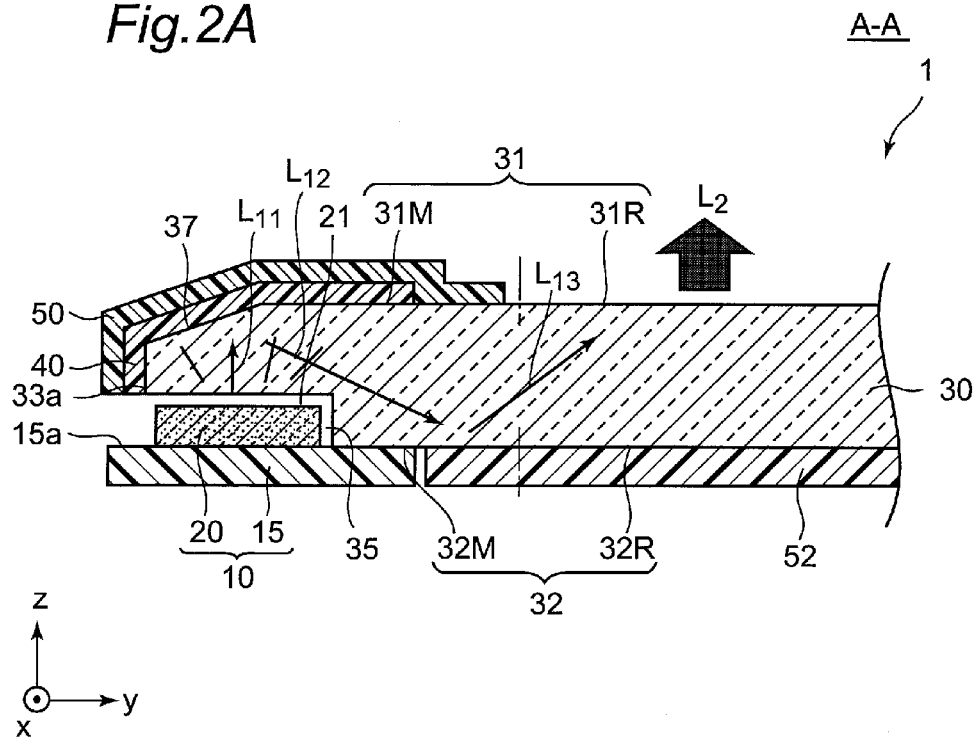
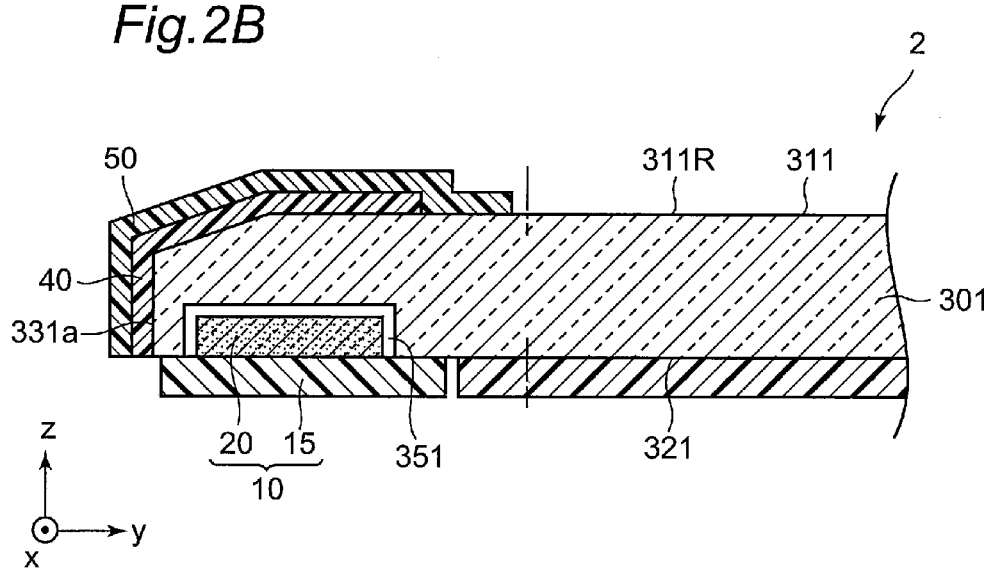

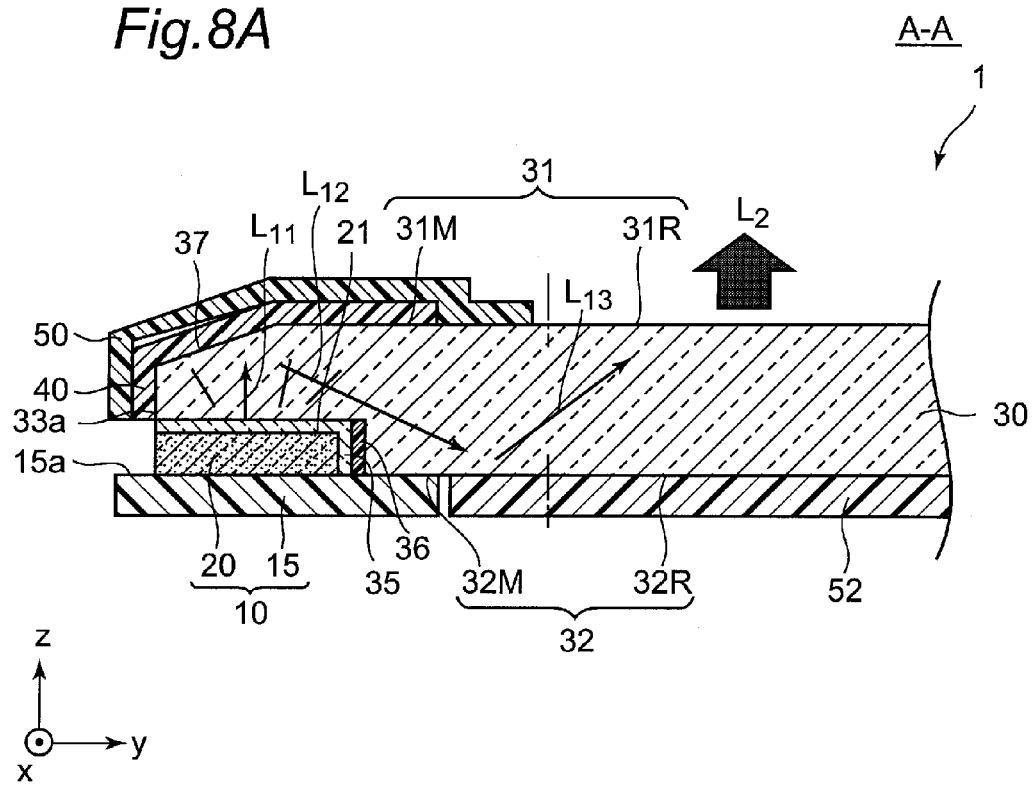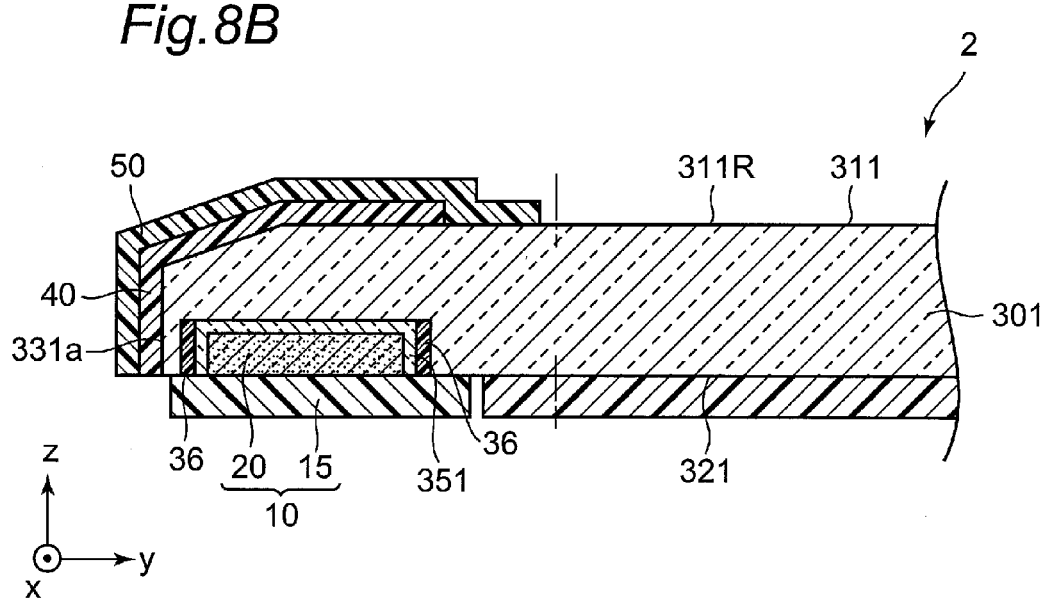

LIGHTING DEVICE AND METHOD FOR MANUFACTURING THE SAME

CROSS-REFERENCE TO RELATED APPLICATION

This application claims priority to Japanese Patent Application No. 2015-193835, filed on Sep. 30, 2015, the disclosure of which is hereby incorporated by reference in its entirety.

BACKGROUND

The present disclosure relates to a lighting device and a method for manufacturing a lighting device.

An edge-light type backlight is a lighting device that uses a light guide plate, and is designed such that a light-emitting surface of a light-emitting element is disposed facing the lateral surface of the light guide plate. In this backlight, light entering the light guide plate is spread across the entire light guide plate while repeatedly reflecting between a light-extraction surface and a rear surface of the light guide plate. Then, the light exits from the light-extraction surface.

A backlight emitting white light is known to use a blue light-emitting element and to cover the entire light-extraction surface or entire rear surface of the light guide plate with an yellow phosphor layer (a wavelength conversion layer) (see, for example, Japanese unexamined Patent Applications JP 2005-85718 A, JP 2000-009942 A, and JP 2002-096680 A). Part of the blue light emitted from the light-emitting element is wavelength-converted to yellow light with a wavelength conversion layer, and then guided within the light guide plate. The remaining part of the blue light from the light-emitting element is guided within the light guide plate without subjecting wavelength-conversion. In this way, the yellow light and the blue light are mixed together in the light guide plate, thereby producing a white-light backlight.

However, when the entire light-extraction surface or rear surface of the light guide plate is covered with a wavelength conversion layer, some of light propagating in the light guide plate is reflected many times by the light-extraction surface or rear surface covered with the wavelength conversion layer until the light exits from the light guide plate to the outside. Such light will experience wavelength conversion many times, and a part of a blue-light in the white light is further wavelength-converted to yellow light. Thus, light extracted from the light-extraction surface tends to be yellowish white light. In particular, the longer the distance traveled by the light within the light guide plate, the greater the number of reflections of the light at the light-extraction surface or rear surface. Consequently, in light exiting from a position on the light guide plate, the light exiting from the position distant from the light-emitting element has a yellowish color, which might lead to color non-uniformity within a light-extraction region.

SUMMARY

Accordingly, an object of an embodiment of the present disclosure is to provide a lighting device in which the light with less color non-uniformity can exit from a light-extraction region of a light guide plate.

A lighting device according to one embodiment of the present disclosure includes a light-emitting component that includes at least one light-emitting element mounted on a base, a light guide plate that guides light emitted from the light-emitting element, a wavelength conversion member that partially covers the light guide plate, and a first reflective member that covers the wavelength conversion member. The light guide plate includes two main surfaces—a light-extraction surface that allows light emitted from the light-emitting element to exit and a rear surface opposite to the light-extraction surface. One of the two main surfaces includes at least one recess disposed in an edge region thereof. The other main surface of the light guide plate includes a part covered by the wavelength conversion member and a part exposed from the wavelength conversion member. The light-emitting element is accommodated in the recess such that a light-emitting surface of the light-emitting element faces the wavelength conversion member.

A lighting device according to another embodiment of the present disclosure includes a light-emitting component that includes at least one light-emitting element mounted on a base, a light guide plate that guides light emitted from the light-emitting element, a wavelength conversion member that partially covers the light guide plate, and a first reflective member that covers the wavelength conversion member. The light guide plate includes two main surfaces—a light-extraction surface that allows light emitted from the light-emitting element to exit and a rear surface opposite to the light-extraction surface. The light-emitting element is embedded in an edge portion of the light guide plate such that a light-emitting surface of the light-emitting element faces an edge region of one of the main surfaces of the light guide plate. The other main surface of the light guide plate includes a part covered by the wavelength conversion member and a part exposed from the wavelength conversion member such that a light-emitting surface of the light-emitting element faces the wavelength conversion member.

A method for manufacturing a lighting device according to one embodiment of the present disclosure includes: providing a light-emitting component that includes at least one light-emitting element mounted on a base; providing a light guide plate that includes two main surfaces, which include a light-extraction surface and a rear surface opposite to the light-extraction surface, one of two main surfaces including at least one recess formed in an edge region thereof; assembling the light-emitting component and the light guide plate such that the light-emitting element is accommodated in the recess of the light guide plate and a light-emitting surface of the light-emitting element faces the other main surface of the light guide plate; disposing a wavelength conversion member such that the wavelength conversion member faces the light-emitting surface of the light-emitting element and covers at least a part of an edge region of the other main surface of the light guide plate; and disposing a first reflective member to cover the wavelength conversion member.

Accordingly, the lighting device in the embodiments of the present disclosure can reduce the color non-uniformity of the light exiting from the light-extraction region of the light guide plate in the lighting device. Furthermore, the method for manufacturing a lighting device in the embodiment of the present disclosure can produce the lighting device in which light with less color non-uniformity exits from the light-extraction region of the light guide plate.

BRIEF DESCRIPTION OF THE DRAWINGS

FIG. 1 is a schematic plan view of a lighting device according to a first embodiment;

FIG. 2A is a schematic cross-sectional view of the lighting device taken along the line A-A of FIG. 1;

FIG. 2B is a schematic cross-sectional view of the lighting device according to the first embodiment which includes a light guide plate different from that shown in FIG. 2A;

FIGS. 8A and 8B are schematic cross-sectional views of other lighting devices according to the first embodiment;

DETAILED DESCRIPTION

Figure 3A:
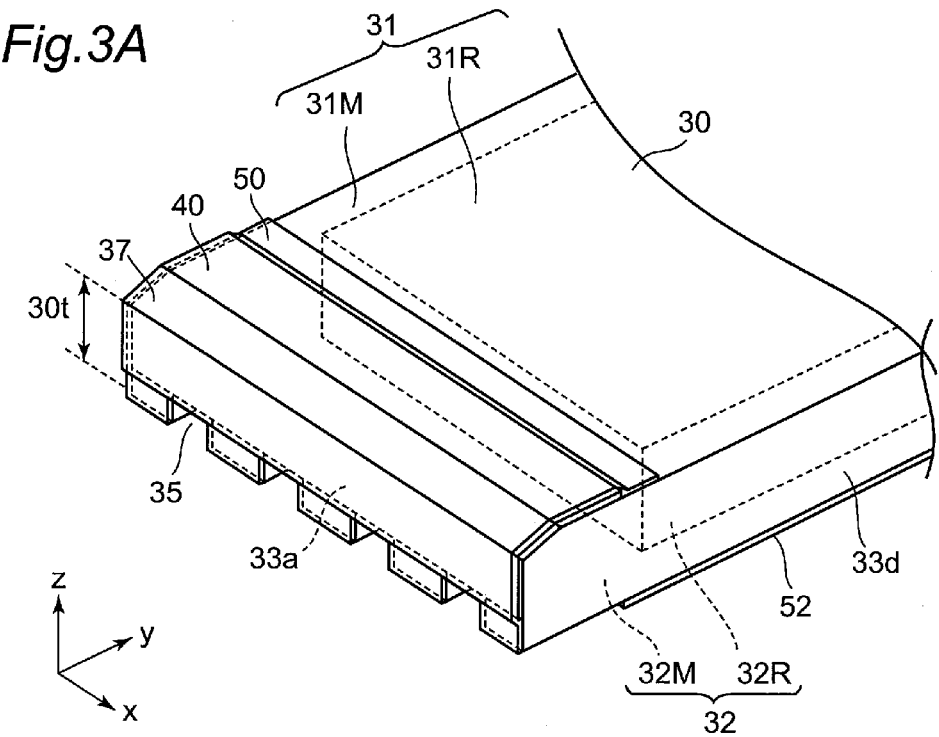
FIGS. 3A and 3B are schematic perspective views from a light-extraction surface side of the light guide plate that can be used in the lighting device in the first embodiment.

Embodiments of the present disclosure will be described in detail below with reference to the accompanying drawings. Note that lighting devices and manufacturing methods therefor to be mentioned below are to embody the technical idea of the embodiments and are not intended to limit the scope of the present invention. In particular, the dimension, material, shape, relative arrangement, etc., of each component do not limit the technical scope of the present invention and are merely illustrative by way of example. Some of them are emphasized to clarify the description. Furthermore, the embodiments to be mentioned below can be applied by combining some of their components and the like as appropriate.

In the description below, the terms (e.g. upper, lower, right, left, and other words including these words) indicative of specific directions or positions are used as appropriate. The use of these terms is to make the understanding of the present invention easy with reference to the drawings, and does not limit the technical range of the present invention by their meanings. The same reference characters represented through the drawings denote the same parts or members.

First Embodiment

FIG. 1 shows a schematic plan view of a lighting device 1 according to a first embodiment. FIG. 2A is a schematic cross-sectional view of the lighting device 1 taken along the line A-A of FIG. 1. The lighting device 1 in the first embodiment includes a light-emitting component 10 including one or more light-emitting elements 20 mounted on a base 15, a light guide plate 30 for guiding light emitted from the light-emitting element 20, a wavelength conversion member 40 provided to cover an edge region 31M on a light-extraction surface 31 of the light guide plate 30, and a first reflective member 50 covering at least the wavelength conversion member 40. The lighting device 1 of the first embodiment can be used, for example, as a backlight for a liquid crystal display and the like.

The light guide plate 30 is configured to guide light from the light-emitting element 20 and to take the light out of the light-extraction surface 31. As shown in FIG. 2A, the light guide plate 30 has two main surfaces, namely, the light-extraction surface 31 and a rear surface 32 being opposite to the light-extraction surface 31. In the first embodiment, as illustrated in FIG. 1, the light guide plate has a first end surface 33a, a second end surface 33b, a third end surface 33c, and a fourth end surface 33d as the end surfaces positioned between the light-extraction surface 31 and the rear surface 32.

As shown in FIG. 1, the light-extraction surface 31 in the first embodiment includes the edge region 31M (outside the dotted line) and a light-extraction region 31R enclosed by the edge region 31M (inside the dotted line). The term "edge region" as used herein means a part to be covered by a frame when assembling the lighting device 1 into a device (e.g. a liquid crystal display). The edge region 31M is placed with some width extending from the respective end surfaces 33a, 33b, 33c, and 33d of the light guide plate 30 toward the center of the light-extraction surface 31. The dimension and shape of the edge region 31M can be changed according to the dimension and shape of the frame to be used in the device. For example, as illustrated in FIG. 1, the edge region 31M may be made wider in the vicinity of the first end surface 33a where the light-emitting component is to be disposed, and also be made narrower in the vicinity of the second, third, and fourth end surfaces 33b, 33c, and 33d. In this structure, the light-emitting component using the light-emitting element with a wide light-emitting surface can be placed in the edge region 31M on the first end surface side, and the size of the light-extraction region 31R can be set large. The term "light-extraction region" as used herein means an area in which light emission is recognizable from the outside when assembling the lighting device 1 into the device.

Figure 3B:
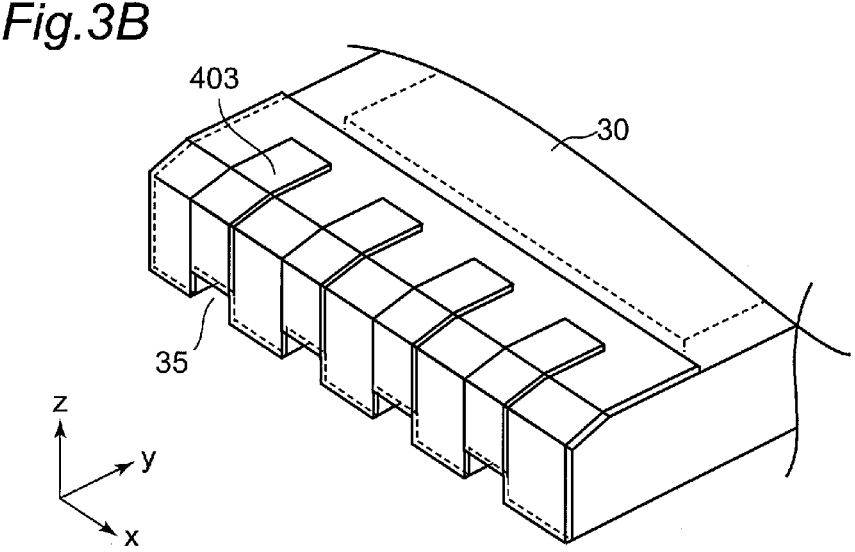
Figure 4A:
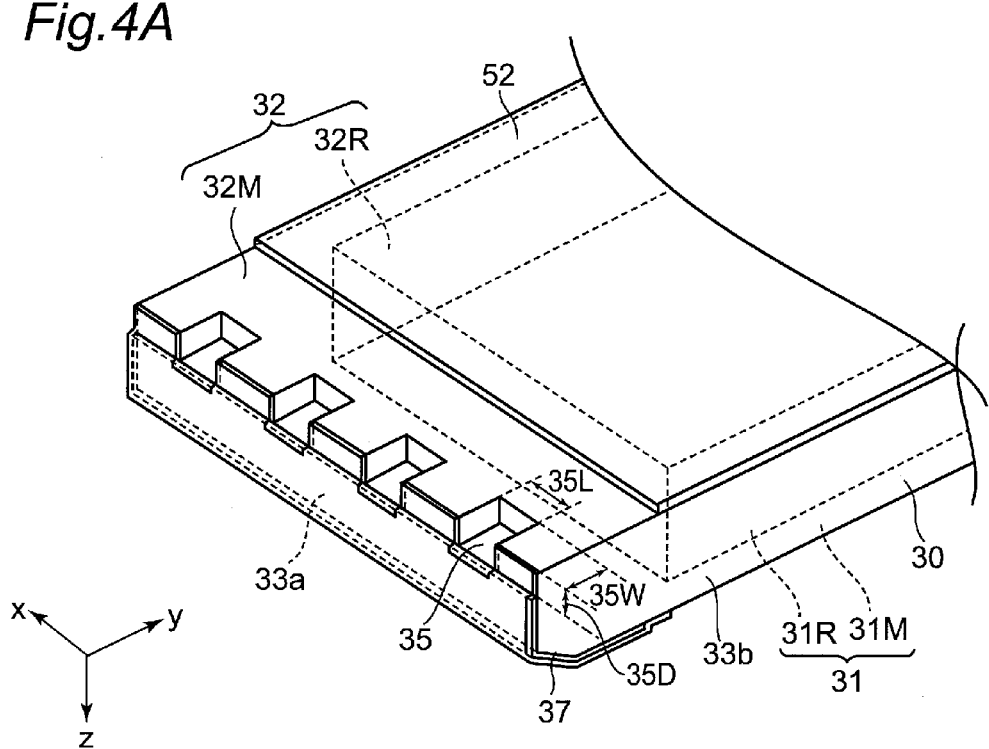
FIGS. 4A and 4B are schematic perspective views from the rear surface of the light guide plate that can be used in the lighting device in the first embodiment.
Figure 4B:
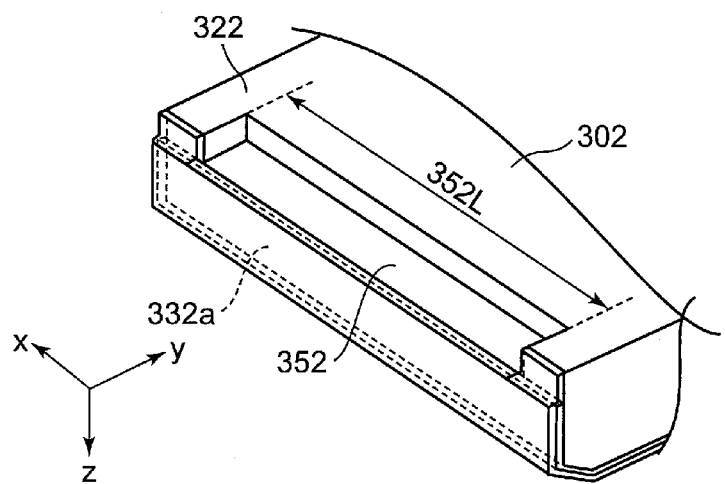
Figure 6A:
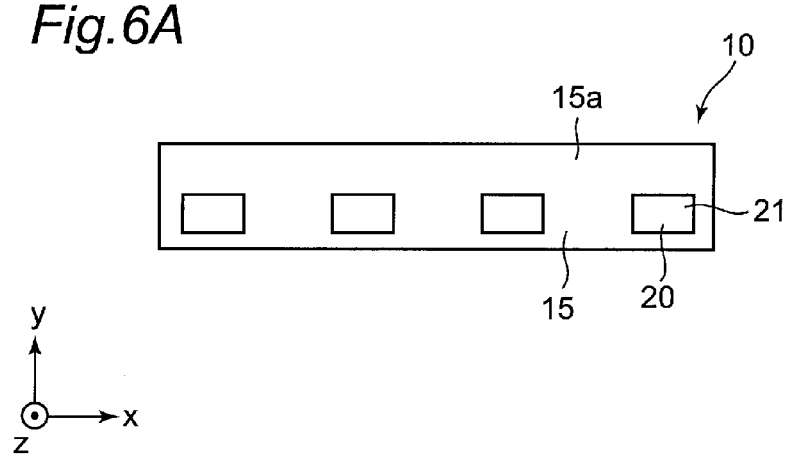
FIG. 6A is a schematic plan view of a light-emitting component that can be used in the lighting device in the first embodiment.
Figure 6B:
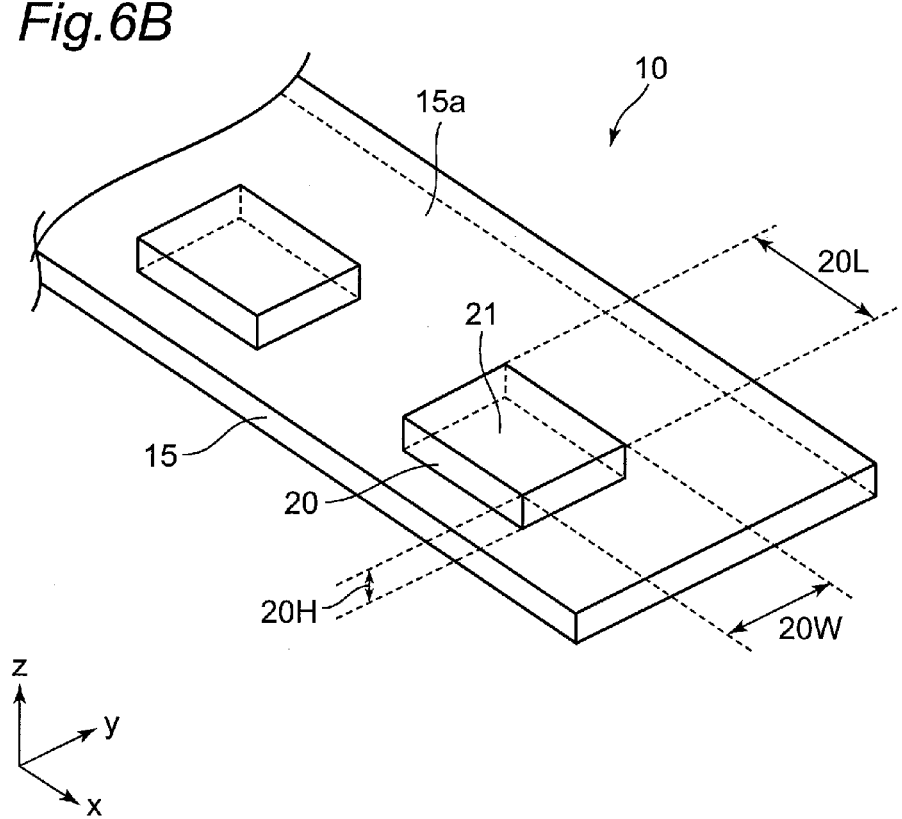
FIG. 6B is a partially enlarged perspective view of the light-emitting component.

FIGS. 3A and 3B are schematic perspective views from the light-extraction surface side of the light guide plate that can be used in the lighting device in the first embodiment. FIGS. 4A and 4B are schematic perspective views from the rear surface of the light guide plate that can be used in the lighting device in the first embodiment. FIG. 6A is a schematic plan view of a light-emitting component that can be used in the lighting device in the first embodiment. FIG. 6B is a partially enlarged perspective view of the light-emitting component.

The light guide plate 30 has one or more recesses 35 in the edge region located on one of the two main surfaces thereof. In the first embodiment, the recesses 35 are provided in the edge region on the rear surface 32 of the light guide plate 30. Hereinafter, an edge region on the rear surface 32 of the light guide plate 30, that is, in the rear surface 32 of the light guide plate 30, a region corresponding to the edge region 31M of the light-extraction surface 31, is referred to as a "rear surface edge region 32M". Thus, in the first embodiment, the recesses 35 are provided in the rear surface edge region 32M. In the rear surface 32, a region corresponding to the light-extraction region 31R of the light-extraction surface 31 is hereinafter referred to as a "rear surface center region 32R".

In the first embodiment, as shown in FIGS. 1 and 2A, each recess 35 is capable of accommodating therein a light-emitting element 20 of the light-emitting component 10 such that the light-emitting surface of the light-emitting element 20 faces the light-extraction surface 31. The expression "light-emitting surface is disposed to face the light-extraction surface 31" as used herein means that the light-emitting surface is directed toward the light-extraction surface 31 (that is, a normal line to the light-emitting surface intersects the light-extraction surface 31). Part of the light guide plate 30 extends in a gap between the adjacent recesses 35. This arrangement allows part of the light emitted from the lateral surface of the light-emitting element 20, which reaches the part of the light guide plate 30, to enter the light guide plate 30 when accommodating the light-emitting element 20 in the recess 35.

Here, as illustrated in FIG. 4A, the size of each recess 35 is set to have a length 35L (i.e., dimension in the x direction), a width 35W (dimension in the y direction), and a depth 35D (i.e., dimension in the z direction); and as illustrated in FIG. 6B, the size of each light-emitting element 20 is set to have a length 20L (i.e., dimension in the x direction), a width 20W (i.e., dimension in the y direction), and a height 20H (i.e., dimension in the z direction). In this case, as illustrated in FIG. 2A, when accommodating each light-emitting element 20 in each recess 35, the size of each recess 35 is preferably set to satisfy the relationships below in order not to be in contact of the light-emitting element 20 with the surface of the recess 35: Length 35L>Length 20L, Width 35W>Width 20W, and Depth 35D>Height 20H. In this way, the formation of a space between the recess 35 and the light-emitting element 20 can contribute to the easy assembly of the light guide plate 30 and the light-emitting component 10. After the assembly, the light guide plate 30 and each light-emitting element 20 are less likely to interfere with each other even if mechanical stress is applied from the outside, thus making it possible to reduce breakage of the light-emitting element 20, and the like.

Although FIGS. 1, 3A, 3B, and 4A show four recesses 35 in the light guide plate 30, the number of recesses is not limited thereto. A plurality of light-emitting elements may be accommodated in one recess. For example, as shown in FIG. 4B, an elongated recess 352 extending along a first end surface 332a may be provided on the rear surface 322 side of a light guide plate 302. In this case, a plurality of light-emitting elements can be accommodated in the elongated recess 352. In this way, forming of only one recess facilitates the manufacturing of the light guide plate 302. The number and arrangement of the light-emitting elements included in the light-emitting component to be used in the lighting device can be changed depending on a length 352L of the recess 352. Thus, the light guide plate can be combined with various types of light-emitting components, which enhances the versatility of the light guide plate.

In the first embodiment, as illustrated in FIGS. 2A, 3A, and 4A, the recesses 35 of the light guide plate 30 may be opened at the first end surface 33a of the light guide plate 30. Thus, as shown in FIG. 2A, when accommodating each light-emitting element 20 in each recess 35, the light-emitting element 20 can be moved in the y direction from the first end surface 33a side, thereby facilitating the assembly of the light-emitting component 10 and the light guide plate 30. When accommodating each light-emitting element 20 in each recess 35, one lateral surface of the light-emitting element 20 (the lateral surface positioned at the first end surface 33a side as shown in FIG. 2A) may be exposed outward from the opening of the recess 35.

FIG. 2B is a schematic cross-sectional view of a lighting device 2 including a light guide plate different from that shown in FIG. 2A, according to the first embodiment. A recess 351 in a light guide plate 301 shown in FIG. 2B does not need to be opened at a first end surface 331a of the light guide plate 301. That is, when accommodating the light-emitting element 20 in the recess 351, all the lateral surfaces of the light-emitting element 20 may be enclosed by the light guide plate 301. With this arrangement, the light propagating from the lateral surface of the light-emitting element 20 (a lateral surface positioned at the first end surface 331a side in FIG. 2B) toward the first end surface 331a of the light guide plate 301 can be guided toward the light-extraction region side. The wavelength conversion member 40 and a first reflective member 50 described later may easily extend to an area facing the lateral surface of the light-emitting element 20 positioned at the first end surface 331a side as shown in FIG. 2B.

As shown in FIGS. 2A and 3A, part of the edge region on one main surface of the light guide plate 30 opposite to the other main surface provided with the recesses 35, that is, part of the edge region 31M on the light-extraction surface 31 in the first embodiment may be formed as an inclined surface 37. The inclined surface 37 can be formed to chamfer a ridge between the light-extraction surface 31 and the first end surface 33a. At least part of the inclined surface 37 is positioned directly above the one or more recesses 35 (i.e., directly above the one or more light-emitting element 20). In the first embodiment, the inclined surface 37 is directed toward the rear surface center region 32R of the rear surface 32 of the light guide plate 30.

Such an inclined surface 37 allows the light emitted from each light-emitting element 20 to be reflected by the inclined surface 37 (and the first reflective member 50 provided thereon), making the reflected light propagate likely toward the rear surface center region 32R. Thus, the light is less likely to be repeatedly reflected within a portion of the light guide plate 30 positioned between the edge region 31M and rear surface edge region 32M (the portion being referred to as an edge portion of the light guide plate 30), so that the light emitted from each light-emitting element 20 can be efficiently exited from the light-extraction region 31R.

FIGS. 5A to 5D are schematic cross-sectional views of the light guide plates that can be used in the lighting device in the first embodiment.

As illustrated in FIGS. 5A to 5D, the inclined surface 37 of the light guide plate may be changed to a curved surface or a surface including a plurality of inclined surfaces.

Figure 5A:
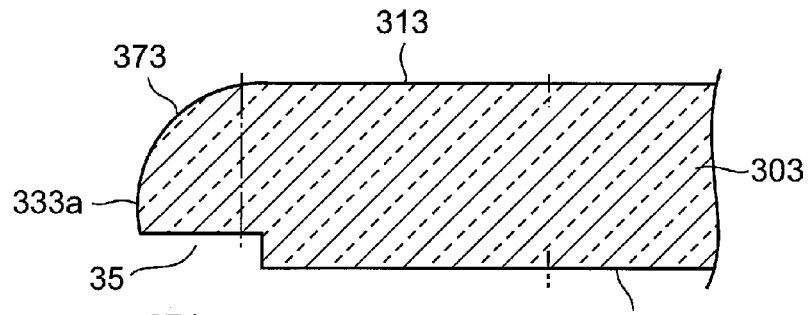
FIGS. 5A to 5D are schematic cross-sectional views of light guide plates that can be used in the lighting device in the first embodiment.

In a light guide plate 303 shown in FIG. 5A, part of the edge region on the main surface of the light guide plate opposite to the surface provided with the recess 35, that is, part of the edge region of a light-extraction surface 313 in the first embodiment, has a curved surface 373. The curved surface 373 is formed to chamfer a ridge between the light-extraction surface 313 and a first end surface 333a. At least part of the curved surface 373 is positioned directly above the recess 35. The curved surface 373 shown in FIG. 5A has the function of reflecting the light emitted from the light-emitting element accommodated in the recess 35, toward a rear surface center region 323R. Thus, the light from the light-emitting element can easily exit from the light-extraction region.

Figure 5B:
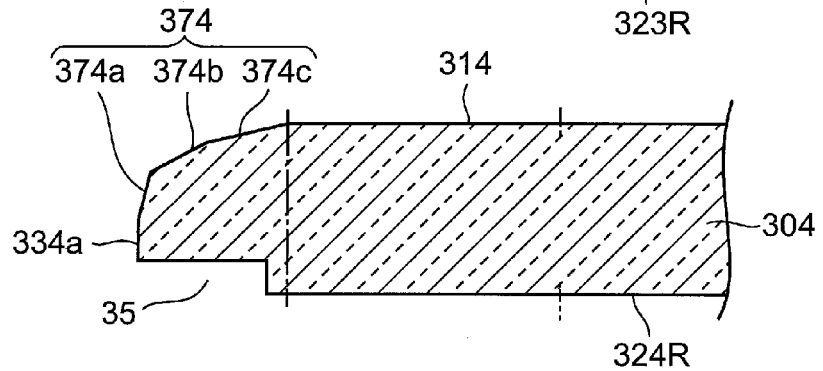

In a light guide plate 304 shown in FIG. 5B, part of the edge region on the main surface of the light guide plate opposite to the surface provided with the recess 35, that is, part of the edge region of a light-extraction surface 314 in the first embodiment has a composite inclined surface 374 that includes a plurality of inclined surfaces 374a, 374b, and 374c. In the plurality of inclined surfaces 374a, 374b, and 374c forming the composite inclined surface 374, the inclination angles of the plurality of inclined surfaces 374a, 374b, and 374c decrease going from a first end surface 334a toward the light-extraction surface 314. The composite inclined surface 374 is positioned directly above the recess 35. Like the curved surface 373 shown in FIG. 5A, the composite inclined surface 374 shown in FIG. 5B has the function of reflecting the light from the light-emitting element accommodated in the recess 35, toward a rear surface center region 324R. Thus, the light from the light-emitting element can easily exit from the light-extraction region.

Figure 5C:
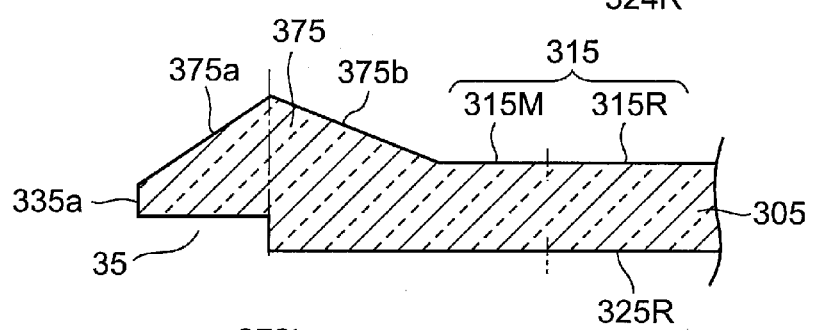

A light guide plate 305 shown in FIG. 5C has a protrusion 375 in the edge region on the main surface opposite to the surface provided with the recess 35, that is, in an edge region 315M of a light-extraction surface 315 in the first embodiment. The protrusion 375 has a triangular cross-section that protrudes upward from the light-extraction surface 315. Two inclined surfaces 375a and 375b forming the protrusion 375 have reverse inclination directions. The first inclined surface 375a close to a first end surface 335a shown in FIG. 5C is directed toward a rear surface center region 325R. The first inclined surface 375a is positioned directly above the recess 35, and has the function of reflecting the light from the light-emitting element accommodated in the recess 35 toward the rear surface center region 325R. On the other hand, a second inclined surface 375b positioned on a light-extraction region 315R side shown in FIG. 5C is directed toward the first end surface 335a. The light reaching the second inclined surface 375b is reflected toward the first end surface 335a, and eventually, reflected toward the light-extraction region 315R. Such a protrusion 375 can facilitate the alignment when assembling the light guide plate together with the frame and the like in the device.

Figure 5D:
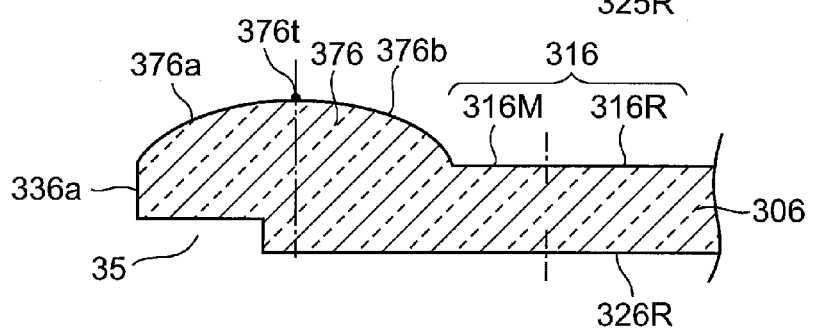

A light guide plate 306 shown in FIG. 5D has a protrusion 376 in the edge region on the main surface opposite to the surface provided with the recess 35, that is, in an edge region 316M of a light-extraction surface 316 in the first embodiment. The protrusion 376 has a semi-elliptical cross-section that protrudes upward from the light-extraction surface 316. The direction of an imaginary tangent line to a semi-elliptical curved surface forming the protrusion 376 is reversed at a top 376t of the protrusion 376 as a turning point for both sides. Specifically, an imaginary tangent line to a first curved surface 376a close to a first end surface 336a shown in FIG. 5D is directed toward the rear surface center region 326R. The first curved surface 376a is positioned directly above the recess 35 (i.e., directly above the light-emitting element), and has the function of reflecting the light from the light-emitting element accommodated in the recess 35 toward the rear surface center region 326R. On the other hand, a second curved surface 376b positioned on a light-extraction region 316R side shown in FIG. 5D is directed toward the first end surface 336a. The light reaching the second curved surface 376b is reflected toward the first end surface 336a, and eventually reflected toward the light-extraction region 316R. Such a protrusion 376 can facilitate the alignment when assembling the light guide plate together with the frame and the like in the device.

The wavelength conversion member 40 is a member that receives the light from the light-emitting element 20 and generate light in a different color from an emission color of the light-emitting element 20. The wavelength conversion member 40 in the first embodiment covers only the edge region on the main surface opposite to the other main surface provided with the recess 35 of the light guide plate 30. In the first embodiment, as shown in FIGS. 2A, 3A, and 3B, wavelength conversion member 40 is disposed in the edge region 31 M on the light-extraction surface 31 of the light guide plate 30.

The wavelength conversion member 40 may not cover all the edge region 31M as shown in FIG. 2A, as long as it is located to be irradiated with sufficient light from the light-emitting element 20. The light-emitting element 20 is accommodated in the recess 35 such that its light-emitting surface 21 is directed toward the main surface direction opposite to the surface provided with the recess 35, that is, toward the light-extraction surface 31 in the first embodiment. Thus, in the first embodiment, the wavelength conversion member 40 is disposed to cover part of the edge region 31M at least on the light-extraction surface 31 of the light guide plate 30 directly above the recess 35. For example, as shown in FIG. 3A, one wavelength conversion member 40 extending in the x direction may be disposed to cover all the regions directly above the four recesses 35. As shown in FIG. 3B, a plurality of wavelength conversion members 403 covering the regions directly above the respective recesses 35 may be disposed spaced apart from each other based on the positions of the recesses 35.

The wavelength conversion member 40 can be formed, for example, of a phosphor and a light transmissive resin. The wavelength conversion member 40 may contain one or more kinds of phosphors. The use of the wavelength conversion member 40 containing two or more kinds of phosphors (e.g., an yellow phosphor and a red phosphor) can produce the lighting device 1 having better rendering properties. In the case where the wavelength conversion member 40 contains, for example, yellow and red phosphors, one wavelength conversion layer may contain a mixture of the yellow and red phosphors, but a wavelength conversion member containing a yellow phosphor (i.e., yellow wavelength conversion member) and a wavelength conversion member containing a red phosphor (i.e., red wavelength conversion member) are preferably arranged in stripes. For example, one continuous wavelength conversion member 40 shown in FIG. 3A may be formed of the elongated yellow and red wavelength conversion members that are alternately arranged in the x direction, each wavelength conversion member extending from the light-extraction surface 31 to the first end surface 33a via the inclined surface 37.

In the first embodiment, as shown in FIGS. 2A and 3A, the wavelength conversion member 40 preferably extends to cover not only the edge region 31M of the light-extraction surface 31, but also the first end surface 33a of the light guide plate 30. With this arrangement, the light directed from the light-emitting element 20 toward the first end surface 33a can be wavelength-converted. When the recess 35 is opened at the first end surface 33a, the wavelength conversion member 40 covering the first end surface 33a preferably extends to the base 15 of the light-emitting component 10. That is, the opening at the first end surface 33a is preferably covered with the wavelength conversion member 40. Thus, the light emitted from the lateral surface of the light-emitting element 20 positioned at the first end surface 33a side can be wavelength-converted. When the light guide plate 30 has the inclined surface 37, the wavelength conversion member 40 is preferably disposed to follow the inclined surface 37.

As illustrated in FIG. 2A, the light-emitting element 20 disposed in the recess 35 and the wavelength conversion member 40 are disposed to face each other via the light guide plate 30. That is, the light-emitting element 20 is spaced apart from the wavelength conversion member 40. With such an arrangement, heat generated by the light-emitting element 20 is less likely to be transferred to the wavelength conversion member 40. A phosphor that uses manganese as an activator agent (e.g., KSF and the like) is weak to heat, but this kind of phosphor can be used in the wavelength conversion member 40 by spacing the light-emitting element 20 apart from the wavelength conversion member 40. With such an arrangement, quantum dots, which are also weak to heat, can also be used in the wavelength conversion member 40.

The first reflective member 50 covers at least the wavelength conversion member 40. In the first embodiment, as shown in FIGS. 2A and 3A, the first reflective member 50 is disposed to cover the wavelength conversion member 40 disposed on the light-extraction surface 31 of the light guide plate 30. Thus, the light wavelength-converted by the wavelength conversion member 40 can be efficiently reflected toward the rear surface center region 32R, and easily exiting from the light-extraction region. In the first embodiment, the first reflective member 50 may extend to a part of the light-extraction surface 31 where the wavelength conversion member 40 is not disposed. It is preferable that the first reflective member 50 does not cover the light-extraction region 31 R of the light-extraction surface 31. Thus, the light converted by the wavelength conversion member 40 easily exits from the light-extraction region.

The first reflective member 50 preferably extends to the end surface adjacent to the recess 35, i.e., the first end surface 33a in the first embodiment, among the plurality of end surfaces of the light guide plate 30. Thus, the light emitted from the light-emitting element 20 disposed in the recess 35 and directed toward the first end surface 33a can be reflected by the first reflective member 50 to return to the inside of the light guide plate 30. When the light guide plate 30 has the inclined surface 37, the inclined surface 37 is also preferably covered with the first reflective member 50. Thus, the reflection efficiency of light at the inclined surface 37 can be further enhanced.

When the recess 35 is opened at the first end surface 33a, the first reflective member 50 preferably extends from the first end surface 33a further to the base 15 of the light-emitting component. That is, the opening at the first end surface 33a is preferably covered with the first reflective member 50. Thus, the light emitted from the lateral surface of the light-emitting element 20 positioned at the first end surface 33a side can be reflected by the first reflective member 50 to return to the inside of the light guide plate 30.

Furthermore, in the first embodiment, as shown in FIGS. 2A and 4A, a second reflective member 52 is preferably provided on the rear surface 32 of the light guide plate 30. The second reflective member 52 preferably covers at least the rear surface center region 32R. The light converted by the wavelength conversion member 40 and then reflected by the first reflective member 50 toward the rear surface center region 32R can be reflected by the second reflective member 52 toward the light-extraction surface 31 side and then emitted from the light-extraction region 31R.

As mentioned above, in the first embodiment, the wavelength conversion member 40 covers part or whole of the edge region 31 M on the light-extraction surface 31 of the light guide plate 30 (at least the region directly above the recess 35), but does not cover the light-extraction region 31R. The wavelength conversion member 40 of the first embodiment is not provided at the rear surface 32 of the light guide plate 30. With such an arrangement, as shown in FIG. 2A, part of the light emitted from the light-emitting surface 21 of the light-emitting element 20 disposed in the recess 35 (as indicated by an arrow $L_{11}$) reaches the wavelength conversion member 40 disposed directly above the light-emitting element 20 and is then wavelength-converted. The wavelength-converted light is reflected by the first reflective member 50 covering the wavelength conversion member 40 and directed toward the rear surface 32 of the light guide plate 30 (as indicated by an arrow $L_{12}$). The light reflected by the rear surface 32 (as indicated by an arrow $L_{13}$) propagates within the light guide plate 30 while being reflected between the light-extraction region 31R on the light-extraction surface 31 of the light guide plate 30 and the rear surface center region 32R of the rear surface 32, and is eventually taken out of the light-extraction region 31 R on the light-extraction surface 31 of the light guide plate 30 (as indicated by an arrow $L_2$). Therefore, the light from the light-emitting element 20 is wavelength-converted by the wavelength conversion member 40 provided in the edge region 31M on the light-extraction surface 31 of the light guide plate 30, but then while the light propagates at least between the light-extraction region 31 R and the rear surface center region 32R, the light does not experience the wavelength conversion again by the wavelength conversion member 40. Thus, the color of light taken out of the light-extraction surface 31 of the light guide plate 30 can be relatively uniform regardless of a traveled distance by the light. That is, the lighting device 1 of the first embodiment can have little color unevenness across the entire light-extraction region.

As shown in FIG. 6A, the light-emitting component 10 includes the base 15 and one or more light-emitting elements 20 mounted on an upper surface 15a of the base 15. In the first embodiment, the light-emitting elements 20 are arranged in one line along the longitudinal direction (x direction) of the elongated base 15. The distance between the centers of the adjacent light-emitting elements 20 is identical to that between the centers of the recesses 35 in the light guide plate 30. As mentioned above, in order to allow the light-emitting element 20 to be accommodated in the recess 35 of the light guide plate 30, as illustrated in FIGS. 4A and 6B, the size of the light-emitting element 20 preferably has the relationship with the size of the recess 35 of the light guide plate 30 as follows: length 35L of recess 35>length 20L of light-emitting element 20, width 35W of recess 35>width 20W of light-emitting element 20, and depth 35D of recess 35 >height 20H of light-emitting element 20.

Here, when the height 20H of the light-emitting element 20 is smaller than the width 20W of the light-emitting element, as shown in FIG. 2A, the light-emitting surface 21 of the light-emitting element 20 can be disposed to face upward (in the z direction), whereby the thickness of the light guide plate 30 can be reduced, compared to when the light-emitting surface 21 is disposed laterally (in the y direction). In particular, with this arrangement, as shown in FIG. 3A, a maximum thickness 30t of the light guide plate 30 (thickness of a part not having the recess 35) at the first end surface 33a close to the recess 35 can be thinned. The width 20W of the light-emitting element 20 is preferably larger than the maximum thickness 30t of the light guide plate 30 at the first end surface 33a. Thus, the extraction of light from the light-extraction region can be improved while reducing the height of the lighting device.

Figure 7A:
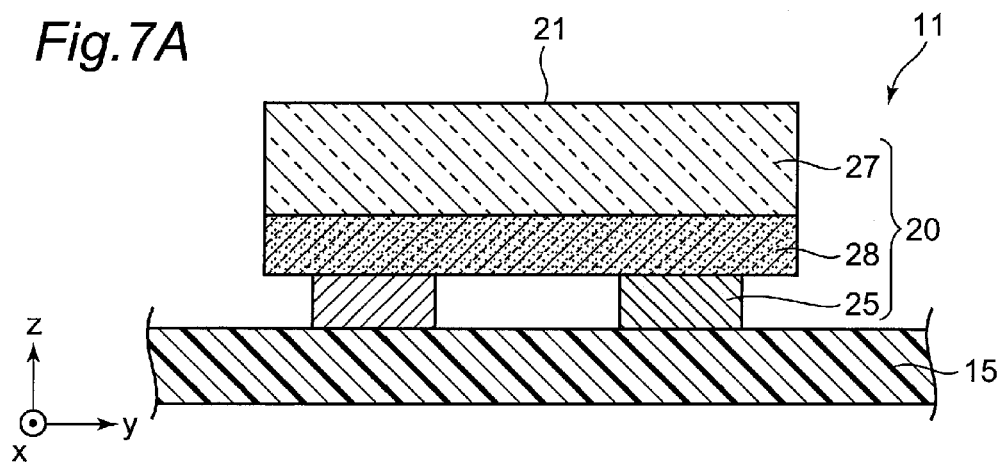
FIGS. 7A to 7C are schematic cross-sectional views of the light-emitting component.
Figure 7B:
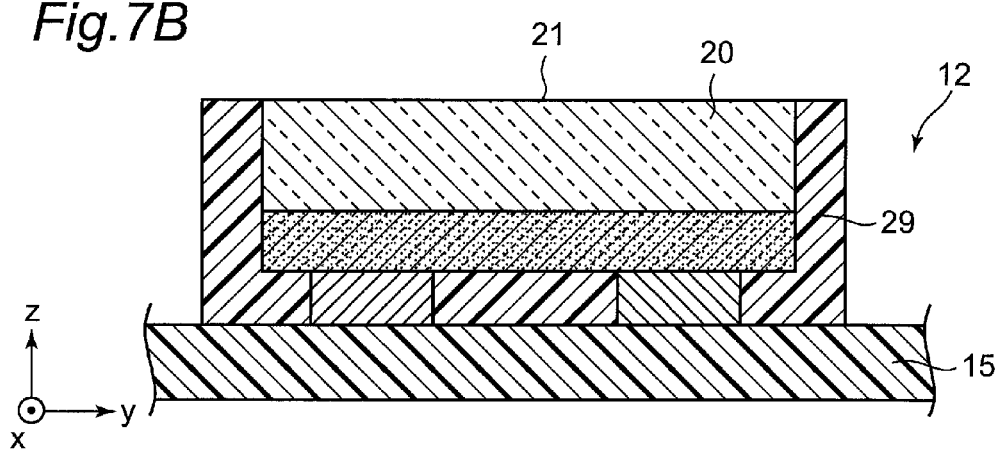
Figure 7C:
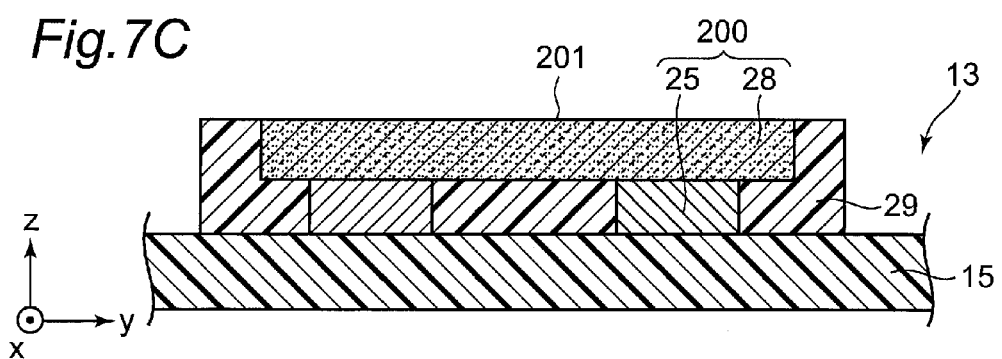

FIGS. 7A to 7C are schematic cross-sectional views of different light-emitting components. The light-emitting element 20 suitable for the light-emitting component 10 can be, for example, a semiconductor light-emitting element. The light-emitting element 20 included in a light-emitting component 11 shown in FIG. 7A includes a semiconductor layer 28 containing a light-emitting layer, a growth substrate 27 for growing the semiconductor layer 28, and a pair of electrodes 25 for bringing the semiconductor layer 28 into electrical conduction with an external power source. The pair of electrodes 25 is provided on the same surface of the light-emitting element 20, more specifically, on a surface of the light-emitting element 20 opposite to the light-emitting surface 21 (i.e., the upper surface of the growth substrate 27).

The light-emitting element 20 utilizes the transparent growth substrate 27 (e.g., sapphire substrate), and through the growth substrate 27, light is taken out. In the light-emitting component 11, the light is emitted not only from the light-emitting surface 21 of the light-emitting element 20 but also from the lateral surface of the light-emitting element 20. When using the light-emitting element 20 emitting the light from its lateral surface in this way, a light-shielding member for shielding or reflecting the light emitted from the lateral surfaces of the light-emitting element 20 is preferably provided at the light guide plate 30 and/or the lateral surface of the light-emitting element 20.

For example, as shown in FIGS. 8A and 8B, in recess 35, 351 of the light guide plate 30, 301, a light-shielding member 36 can be provided at an inner surfaces (hereinafter referred to as a lateral surface of the recess) of the recess other than a surface thereof facing the wavelength conversion member 40. The light-shielding member 36 can greatly reduce the light propagating from the lateral surface of the light-emitting element 20 in the lateral (y) direction, i.e., the light not subjected to the wavelength-conversion by the wavelength conversion member 40, to be guided to the light guide plate 30. The light-shielding member 36 is provided, and the wavelength conversion member 40 and the first reflective member 50 extend to cover the first end surface (the first end surface and the opening of the first end surface when the recess is opened at the first end surface) as mentioned above, so that the light directed toward the first end can be guided to the light guide plate 30.

As shown in FIG. 7B, a light-emitting component 12 with the lateral surface of the light-emitting element 20 covered with a reflective member 29 may be used. Thus, the light directed toward the lateral surface of the light-emitting element 20 is shielded by the reflective member 29, whereby the majority of the light from the light-emitting element 20 can be emitted from the light-emitting surface 21. The light emitted from the light-emitting surface 21 of the light-emitting element 20 is more likely to propagate in the direction of the opposed wavelength conversion member 40, compared to the light emitted from the lateral surface of the light-emitting element 20. Therefore, most of the light emitted from the light-emitting element 20 can be wavelength-converted.

FIG. 7C shows a light-emitting component 13 that has a light-emitting element 200 composed of the semiconductor layer 28 and electrodes 25, with the lateral surface of the light-emitting element 200 covered with the reflective member 29. Since the light-emitting element 200 does not include a growth substrate, the height of the light-emitting component 13 can be decreased in the z direction from the lower surface of the base 15 to a light-emitting surface 201 of the light-emitting element 200. Consequently, the height of the lighting device 1 can be decreased.

The base 15 may have a pair of wirings on its upper surface 15a. The base 15 is preferably made of material that can shield the light from the light-emitting element 20. In particular, when using the light-shielding material having a high optical reflectivity, the light directed from the light-emitting element 20 toward the base 15 can be reflected from the base 15. The light reflected from the base 15 is eventually emitted from the light-extraction region, thereby enabling improvement of the light extraction efficiency of the illuminating device. It is preferable to use a relatively thin base, such as a flexible base in terms of reducing the thickness of the light-emitting component 10.

As shown in FIGS. 6A and 6B, when mounting the light-emitting element 20 on the base 15, flip-chip mounting is performed by bonding the surface of the light-emitting element 20 provided with the pair of electrodes 25 and located on the opposite side to the light-emitting surface 21 of the light-emitting element 20 with the upper surface 15a of the base 15. In this way, the upper surface 15a of the base 15 and the light-emitting surface 21 of the light-emitting element 20 face in the same direction. In the first embodiment, when assembling the light-emitting component 10 to the light guide plate 30 as illustrated in FIG. 3A, the light guide plate 30 and the light-emitting component 10 are positioned with each other such that the upper surface 15a of the base 15 in the light-emitting component 10 faces the rear surface 32 of the light guide plate 30, with the light-emitting element 20 of the light-emitting component 10 accommodated in the recess 35 of the light guide plate 30. Thus, as shown in FIG. 2A, the light-emitting surface 21 of the light-emitting element 20 in the light-emitting component 10 faces the wavelength conversion member 40 disposed on the light-extraction surface 31 of the light guide plate 30. The term "light-emitting surface 21 faces the wavelength conversion member 40" as used herein means that the light-emitting surface 21 is directed toward the wavelength conversion member 40 (that is, a normal line to the light-emitting surface 21 intersects the wavelength conversion member 40). Therefore, when the light-emitting element 20 emits the light, the light from the light-emitting surface 21 can be sufficiently applied to the wavelength conversion member 40.

In the first embodiment, as shown in FIG. 2A, the light-emitting component 10 is disposed in the rear surface edge region 32M of the light guide plate 30. Thus, as shown in FIG. 1, the light-emitting component 10 is disposed in the edge region 31M in the top view, and can be covered with the frame when assembling the lighting device 1. Although in FIG. 1, the recesses 35 and the light-emitting component 10 are disposed only in the edge region 31M near the first end surface 33a, they may be disposed in other parts of the edge region 31M near other end surfaces 33b, 33c, and 33d as appropriate. A plurality of light-emitting components 10 may be provided, and the recesses may be arranged in respective parts of the edge region 31 M close to two or more end surfaces (e.g. first end surface 33a and third end surface 33c).

Figure 9A:
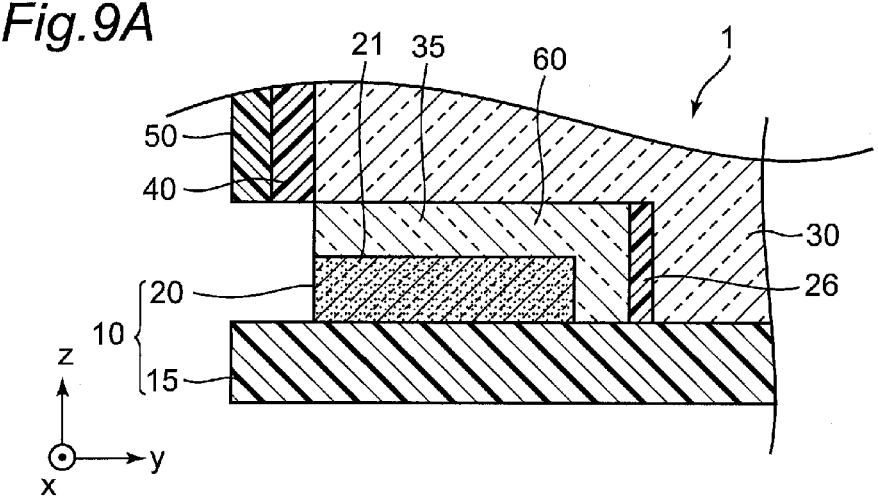
FIG. 9A is a partially enlarged cross-sectional view of the lighting device shown in FIG. 8A.
Figure 9B:
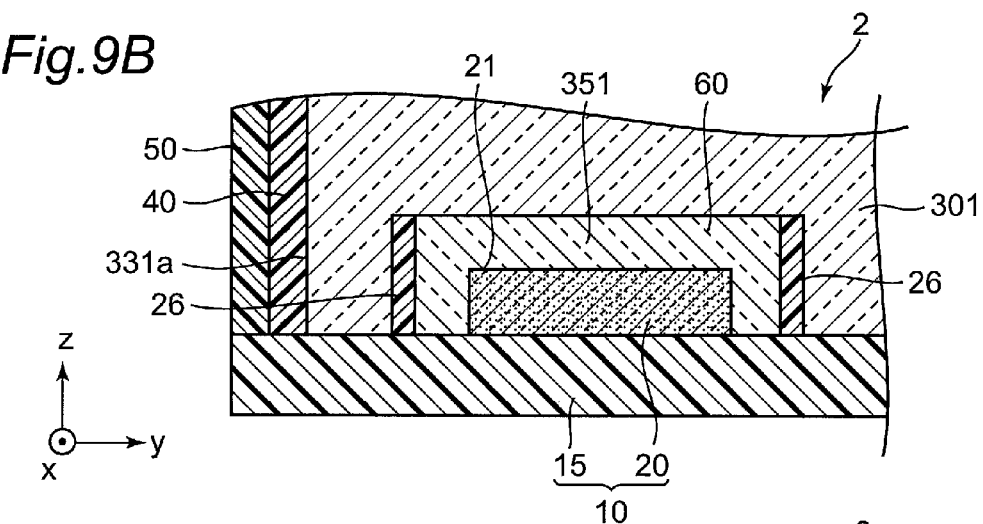
FIG. 9B is a partially enlarged cross-sectional view of the lighting device shown in FIG. 8B.
Figure 9C:
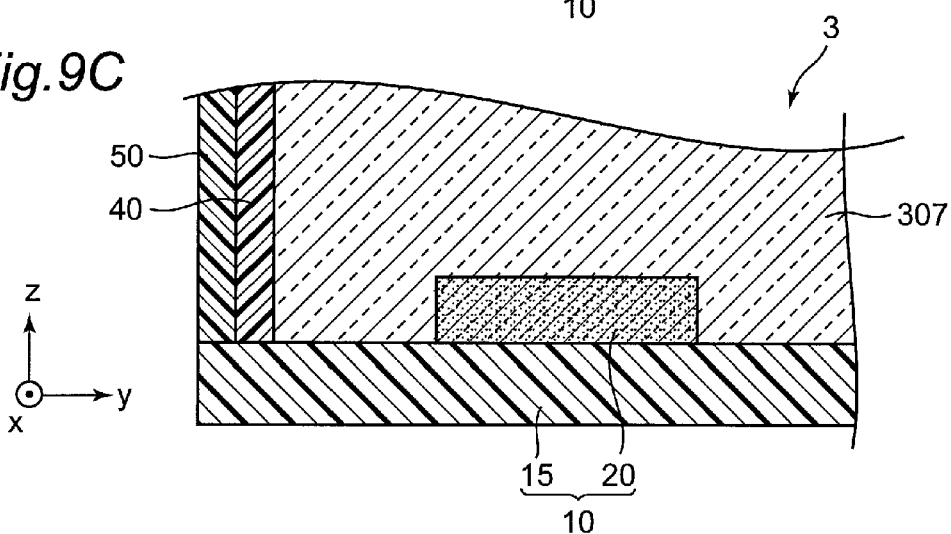
FIG. 9C is a partially enlarged cross-sectional view of the lighting device in the first embodiment.

FIG. 9A is a partially enlarged cross-sectional view of the lighting device shown in FIG. 8A. FIG. 9B is a partially enlarged cross-sectional view of the lighting device shown in FIG. 8B. FIG. 9C is a partially enlarged cross-sectional view of a lighting device according to the first embodiment. As mentioned above, the size of the light-emitting element 20 is preferably set smaller than the size of the recess 35, 351 of the light guide plate 30 such that the light emitting element 20 is not in contact with the inner surface of the recess 35, 351 when accommodating the light-emitting element 20 of the light-emitting component 10 in the recess 35, 351 of the light guide plate 30, 301 (see FIGS. 2A and 2B). Thus, a gap is formed between the light-emitting element 20 and the recess 35, 351, but the gap may be filled with a light transmissive resin 60 as shown in FIGS. 9A and 9B. In particular, a gap between the light-emitting surface 21 of the light-emitting element 20 and the inner surface of the recess 35, 351 of the light guide plate 30, 301 is preferably filled with the light transmissive resin 60 that has a smaller difference in refractive index from that of each of the light-emitting element 20 and the light guide plate 30, as compared to air. In general, the materials forming the light-emitting element 20 have a higher refractive index than the air. Thus, if there is any gap (i.e., an air layer) between the light-emitting surface 21 of the light-emitting element 20 and the light guide plate 30, 301, part of the light emitted from the light-emitting surface 21 toward the gap can be reflected by an interface between the light-emitting surface 21 and the air layer. For this reason, the gap between the light-emitting surface 21 of the light-emitting element 20 and the light guide plate 30 is filled with the light transmissive resin 60 that has the smaller refractive index difference from each of the light-emitting element 20 and light guide plate 30 than the air does. Thus, the reflection of the light from the light-emitting element 20 can be reduced to improve the extraction efficiency of the light from the light emitting element 20. Further, the gap between the light-emitting element 20 and the recess 35, 351 of the light guide plate 30 is filled with the light transmissive resin 60, which has the effect of protecting the light-emitting element 20 from mechanical shock and the like.

In the lighting devices 1 and 2 shown in FIGS. 9A and 9B, the recess 35, 351 are provided in the light guide plate 30, and furthermore the gap between the recess 35, 351 and the light-emitting element 20 is filled with the light transmissive resin 60. Alternatively, in a lighting device 3 shown in FIG. 9C, the light-emitting element 20 may be embedded in an outermost region of a light guide plate 307 (i.e., an area positioned between the edge region of the light extraction surface and the rear surface edge region of the rear surface). Thus, the light-emitting element 20 of the light-emitting component 10 is embedded in the light guide plate 307, whereby the light-emitting element 20 can be protected from external environment.

In the lighting devices 1 and 2 shown in FIGS. 9A and 9B, there are two interfaces between the light-emitting element 20 and the light guide plate 30, 301 (that is, an interface between the light-emitting element 20 and the light transmissive resin 60, as well as an interface between the light transmissive resin 60 and the light guide plate 30, 301). In contrast, in the lighting device 3 shown in FIG. 9C, there is one interface between the light-emitting element 20 and the light guide plate 307. In general, light passing through the interface between different members can be partially reflected. Thus, the smaller the number of interfaces present on an optical path, the better performance the lighting device exhibits. Thus, in the lighting device 3 of FIG. 9C, the number of the interface through which the light emitted from the light-emitting element 20 passes until it reaches the light guide plate 307 is so small that the loss in light entering the light guide plate 307 from the light-emitting element 20 can be reduced.

In the first embodiment, as shown in FIG. 2A, the light-extraction surface 31 and rear surface 32 of the light guide plate 30 are parallel to each other. Alternatively, for example, one of the light-extraction surface 31 and the rear surface 32 may be inclined to the other. Also, the light-emitting surface 21 of the light-emitting element 20 is shown in parallel with the light-extraction surface 31 and rear surface 32 of the light guide plate 30, but may be inclined slightly (e.g. at an angle of 5° or less) with respect to the light-extraction surface 31 and/or rear surface 32. The light-emitting element 20 and a light-incident surface of the light guide plate facing the light-emitting element 20, that is, the respective inner surfaces of the recesses 35 facing the light-emitting element 20 in the first embodiment, are preferably in parallel with each other. Thus, the light from the light-emitting element 20 is allowed to efficiently enter the light guide plate 30.

A method for manufacturing a lighting device according to the first embodiment will be described below.

Light-Emitting Component Providing Step

In a light-emitting component providing step, as shown in FIGS. 6A and 6B, the light-emitting component 10 with one or more light-emitting elements 20 mounted on the upper surface 15a of the base 15 is provided. The base 15 suitable for use is one that has a pair of wirings on the upper surface 15a. The light-emitting element 20 suitable for use has a semiconductor layer including at least a light-emitting layer and a pair of electrodes formed on the same surface. The base 15 and the light-emitting element 20 are flip-chip mounted by adhesive, such as soldering, in such a manner as to bond the pair of wirings on the base 15 to the pair of electrodes on the light-emitting element 20. When the light-emitting component includes a plurality of light-emitting elements 20, these light-emitting elements are preferably mounted in one line along the longitudinal direction (x direction) of the base 15 with a predetermined spacing therebetween.

Light Guide Plate Providing Step

In a light guide plate providing step, as illustrated in FIGS. 3A and 4A, the light guide plate 30 is provided that has two main surfaces, namely, the light-extraction surface 31 and the rear surface 32 opposite to the light-extraction surface 31. In the light guide plate 30, at least one recess 35 is provided in the edge region of either of the main surfaces. In the first embodiment, the light guide plate 30 is provided that has one or more recesses 35 in the rear surface edge region 32M. The light guide plate 30 can be formed by injection molding, cutting, etc.

For the light guide plate 307 having the light-emitting component 10 embedded therein, like FIG. 9C, the light-emitting component 10 provided in the light-emitting component providing step is formed in a mold for the injection molding, followed by, for example, injection molding using a light transmissive resin. In this case, the light guide plate 307 is integrally formed with the light-emitting component 10, and thus a subsequent assembly step of the light-emitting component 10 and the light guide plate 30 will be omitted.

Assembly Step of Light-Emitting Component and Light Guide Plate

In an assembly step of the light-emitting component and the light guide plate, the light-emitting component 10 and the light guide plate 30 are assembled such that the light-emitting element 20 of the light-emitting component 10 is accommodated in the recess 35. In the first embodiment, the recesses 35 in the light guide plate 30 are provided in the rear surface edge region 32M of the light guide plate 30, as shown in FIG. 2A, and the light-emitting component 10 is disposed in the rear surface edge region 32M of the light guide plate 30 such that the light-emitting surface 21 of the light-emitting element 20 faces the light-extraction surface 31 of the light guide plate 30.

As shown in FIGS. 9A and 9B, when the light transmissive resin 60 fills the gap between the light-emitting element 20 and the light guide plate 30, 301, light transmissive resin in a liquid form can be applied in the recess 35, 351 of the light guide plate 30 in advance before assembling the light-emitting component 10 and the light guide plate 30 and then the light-emitting component 10 can be placed in such a manner as to accommodate the light-emitting element 20 in the recess 35, 351.

Wavelength Conversion Member Formation Step

In a wavelength conversion member formation step, as shown in FIGS. 2A and 3A, the wavelength conversion member 40 is provided at the main surface of the light guide plate 30 opposite to the other main surface provided with the recess, that is, in the edge region 31 M on the light-extraction surface 31 in the first embodiment. At this time, at least a region directly above the recess 35 in the edge region 31M on the light-extraction surface 31 (including the inclined surface 37) is covered with the wavelength conversion member 40. Further, the wavelength conversion member 40 is preferably provided to extend to and cover the first end surface 33a side adjacent to the recess 35.

The wavelength conversion member 40 suitable for use can be, for example, a resin sheet containing a phosphor. For example, in the first embodiment, the resin sheet cut in a predetermined size to cover at least the regions directly above the recesses 35 in the edge region 31M can be adhered to a predetermined area of the edge region 31M on the light-extraction surface 31 of the light guide plate 30. By adhering the resin sheet, the wavelength conversion member 40 can be formed in a uniform thickness even at the first end surface and inclined surface. When the recess is opened at the first end surface, the resin sheet can be formed to cover not only the first end surface but also the opening of the first end surface.

The wavelength conversion member 40 may be formed by a spray method. For example, while a mask is applied to a part other than a predetermined area in the edge region 31M on the light-extraction surface 31 of the light guide plate 30, a phosphor-containing liquid resin is sprayed and cured, whereby a desired wavelength conversion member can be formed. For the wavelength conversion member 40 formed by the spray method, the amount of solvent during the molding can be increased, compared to the formation of the resin sheet with adhesive. Thus, the wavelength conversion member 40 can be formed while the ratio of the resin to the phosphor is reduced. Since a phosphor generally has a higher thermal conductivity than a resin, the wavelength conversion member 40 formed by the spray method tends to have a high thermal conductivity and good heat resistance. The spray method facilitates the adjustment of the thickness of the wavelength conversion member.

Formation Step of First Reflective Member 50, Formation Step of Second Reflective Member 52

In a first reflective member formation step, the first reflective member 50 is formed to cover the wavelength conversion member 40. In the first embodiment, as shown in FIGS. 2A and 3A, the first reflective member 50 is formed to cover the wavelength conversion member 40 disposed in the edge region 31M on the light-extraction surface 31 of the light guide plate 30. When the wavelength conversion member 40 is formed to cover not only the edge region on the light-extraction surface, but also the first end surface 33a (that is, the first end surface and the opening at the first end surface when the recess is opened at the first end surface), the first reflective member 50 is also preferably formed to cover the first end surface 33a (that is, the first end surface and the opening at the first end surface when the recess is opened at the first end surface).

In the first embodiment, the second reflective member 52 is preferably disposed at the rear surface 32 of the light guide plate 30. Thus, the light from the light-emitting element 20 is allowed to be reflected toward the light-extraction region 31R.

The first and second reflective members 50 and 52 are made of materials that can reflect the light from the light-emitting element, for example, using a resin containing a reflective material. Examples of the methods for manufacturing the reflective members can include a method using adhering of the resin sheet containing a reflective material, and a method using spraying of a liquid resin containing a reflective material. In particular, the liquid resin containing the reflective material is preferably sprayed to form the first reflective member 50 and the second reflective member 52. Thus, the thin, dense reflective members can be formed, thereby producing the thin lighting device having a high light extraction efficiency.

As mentioned above, the manufacturing method according to the first embodiment can form the lighting device in which the wavelength conversion member 40 covers part or whole of the edge region 31 M on the light-extraction surface 31 of the light guide plate 30 (at least the region directly above the recesses 35). Therefore, the color of the light taken out of the light-extraction surface 31 of the light guide plate 30 can be relatively uniform regardless of the distance traveled by the light, thus producing the lighting device 1 with less color non-uniformity across the entire light-extraction region.

Second Embodiment

A second embodiment differs from the first embodiment in that, unlike the first embodiment, the recess of the light guide plate is formed on the light-extracting surface side of the light guide plate, and the wavelength conversion member and the first light reflective member are formed on the rear surface of the light guide plate. The structures of other components in the second embodiment are the same as those in the first embodiment. Now, mainly points that are different from the first embodiment will be explained.

Figure 10:
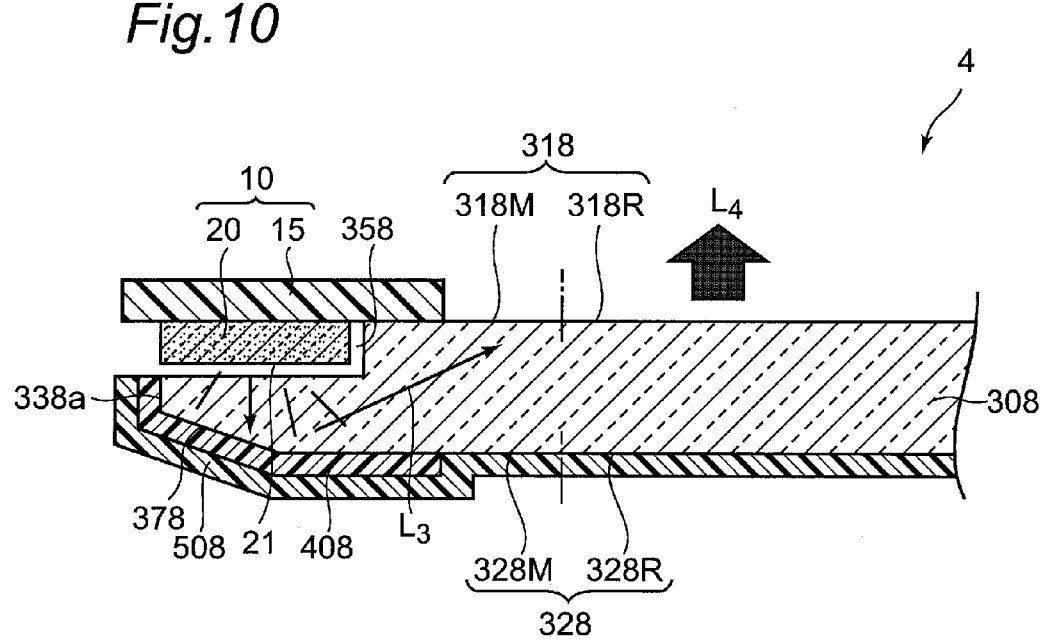
FIG. 10 is a schematic cross-sectional view of a lighting device according to a second embodiment.

FIG. 10 is a schematic cross-sectional view of a lighting device 4 according to a second embodiment. The lighting device 4 includes the light-emitting component 10 including the light-emitting element 20, a light guide plate 308 for guiding light emitted from the light-emitting element 20, a wavelength conversion member 408 provided in the rear surface edge region 328M on the rear surface 328 of the light guide plate 308, and a first reflective member 508 covering at least the wavelength conversion member 408. The lighting device 4 in the second embodiment can be used, for example, as a backlight for a liquid crystal display, as well as the first embodiment.

In the second embodiment, one or more recesses 358 are provided in an edge region 318M of a light-extraction surface 318 of the light guide plate 308. In the case of a plurality of the recesses 358, the light guide plate 308 and the light-emitting component 10 are disposed such that each light-emitting element 20 of the light-emitting component 10 is accommodated in each recess 358.

An inclined surface 378 may be provided in a rear surface edge region 328M of the light guide plate 30. The inclined surface 378 in the second embodiment is formed to chamfer a ridge between the rear surface 328 and a first end surface 338a. At least part of the inclined surface 378 is positioned directly below the recess 358. The inclined surface 378 is directed toward a light-extraction region 318R on the light-extraction surface 318 of the light guide plate 308. Thus, the light emitted downward from the light-emitting element 20 is wavelength-converted by the wavelength conversion member 408 provided on the inclined surface 378, reflected by the first reflective member 508 provided under the wavelength conversion member 408, and then the reflected light is directed toward the light-extraction region 318R. Thus, the light is less likely to be repeatedly reflected within an area of the light guide plate 308 positioned between the edge region 318M and the rear surface edge region 328M. In a manner similar to the first embodiment, the inclined surface 378 may be changed to a curved surface or a plurality of inclined surfaces. A protrusion may be provided in the rear surface edge region 328M on the rear surface 328 of the light guide plate 308.

The wavelength conversion member 408 is disposed in the rear surface edge region 328M of the light guide plate 30. The wavelength conversion member 408 is disposed to receive enough light from the light-emitting element 20. The light-emitting element 20 of the second embodiment is accommodated in the recess 358 such that the light-emitting surface 21 is opposed to the rear surface 328 of the light guide plate 308, that is, the light-emitting surface 21 faces downward in FIG. 10. Thus, the wavelength conversion member 408 is disposed to cover at least the region directly below the recess 358 on the rear surface 328 of the light guide plate 308.

The wavelength conversion member 408 is preferably formed to cover not only the rear surface edge region 328M, but also the first end surface 338a of the light guide plate 308 (the first end surface and the opening at the first end surface when the recess is opened at the first end surface). Thus, the light propagating laterally from the lateral surface on the first end surface side of the light-emitting element 20 can be wavelength-converted. For the light guide plate 308 with the inclined surface 378, the inclined surface 378 is also preferably covered with the wavelength conversion member 408.

In the second embodiment, the wavelength conversion member 408 covers part of the rear surface edge region 328M on the rear surface 328 of the light guide plate 308 (at least the region directly below the recess 358), but does not cover a rear surface center region 328R. The wavelength conversion member 408 is not provided on the light-extraction surface 318 of the light guide plate 308. As indicated by an arrow $L_3$ in FIG. 10, when the light-emitting element 20 disposed in the recess 358 emits light, part of the light emitted from the light-emitting surface 21 reaches the wavelength conversion member 408 disposed directly below the light-emitting element 20 and is then wavelength-converted. Part of the light wavelength-converted is reflected by the first reflective member 508 covering the wavelength conversion member 408, directed toward the light-extraction surface 318 of the light guide plate 308, and then taken out of the light-extraction region 318R to the outside (as indicated by an arrow $L_4$). Part of the light wavelength-converted is reflected by the first reflective member 508, directed toward the light-extraction surface 318 of the light guide plate 308, and then reflected by the light-extraction surface 318. The wavelength conversion member 408 is provided only in the rear surface edge region 328M of the light guide plate 308, so that the light from the light emitting element 20 is wavelength-converted by the wavelength conversion member 408 and thereafter not subjected to the wavelength conversion any more while it is guided within the light guide plate 308. Therefore, the color of the light taken out of the light guide plate 308 can be made relatively uniform. In this way, the lighting device with less color non-uniformity is obtained.

The first reflective member 508 of the second embodiment is disposed to cover the wavelength conversion member 408 on the rear surface 328 of the light guide plate 308. With this arrangement, the light wavelength-converted by the wavelength conversion member 408 is reflected and can return to the light guide plate 308. In the second embodiment, the first reflective member 508 is preferably provided to extend over a region of the rear surface 328 of the light guide plate 308 (a rear surface center region 328R) where the wavelength conversion member 408 is not disposed. Thus, the light from the light-emitting element 20 can easily exit from the light-extraction region 318R.

The first reflection member 508 preferably extends to cover the first end surface 338a adjacent to the recess 358 (the first end surface and the opening at the first end surface when the recess is opened at the first end surface). Thus, the light emitted from the lateral surface of the light-emitting element 20 positioned at the first end surface side is reflected by the first reflective member 508 and then can return to the light guide plate 308. When the light guide plate 308 has the inclined surface 378, the inclined surface 378 is also covered with the first reflective member 508. Thus, the reflection efficiency of light at the inclined surface 378 can be further enhanced.

The light-emitting component 10, an assembly method of the light-emitting component 10 and the light guide plate 308, various preferred embodiments, and a method for manufacturing method a lighting device, all of which are employed in the lighting device of the second embodiment, are similar to those in the first embodiment, and their descriptions will be omitted.

Materials suitable for use in the respective components of the lighting devices in the first and second embodiments will be described below.

Light Guide Plate 30

The light guide plate 30 is made of light transmissive material that allows the light from the light-emitting element 20 to pass therethrough. Examples of materials preferably include a resin material, for example, an acrylic resin, a polycarbonate resin, etc. In particular, the acrylic resin is preferable in terms of the translucency and workability.

Wavelength Conversion Member 40

Examples of materials of the wavelength conversion member 40 include a base material containing a wavelength conversion material. In addition to the above-mentioned material, the wavelength conversion member 40 may contain an inorganic filler, an organic filler, and the like as appropriate. The base materials suitable for use in the wavelength conversion member 40 can include light transmissive resins, for example, a dimethyl silicone resin, a phenyl silicone resin, a dimethyl/phenyl hybrid silicone resin, an epoxy/silicone hybrid resin, a fluorine resin, an adamantane resin, an alicyclic epoxy resin, a hybrid epoxy resin, and a urethane resin. In particular, a silicone resin is preferable in terms of heat resistance, light resistance, and translucency.

The wavelength conversion material suitable for use can be one known in the related art that exhibits lights with different wavelengths when being excited with the light from the light-emitting element 20. Examples of the wavelength conversion material include a phosphor, a quantum dot, and the like. Specifically, examples of the wavelength conversion material can include: an yttrium aluminum garnet (YAG) based phosphor activated with cerium; a lutetium aluminum garnet (LAG) activated with cerium; a nitrogen-containing calcium aluminosilicate (CaO—Al$_2$O$_3$—SiO$_2$) based phosphor activated with europium and/or chromium; a silicate based phosphor ((Sr, Ba)$_2$ SiO$_4$) activated with europium; nitride based phosphors, such as β sialon phosphor, CASN based phosphor, or SCASN based phosphor; a KSF based phosphor (K$_2$SiF$_6$:Mn); a sulfide based phosphor; and a light-emitting material, called a quantum-dot. In particular, in this embodiment, the wavelength conversion layer 40 is disposed between the light guide plate 30 together with the light-emitting element 20, so that a phosphor (e.g., KSF and the like) using an activator agent containing manganese, which has low thermal resistance, and a quantum dot become suitable for use.

When using the KSF or the quantum dots, both of which has low thermal resistance as the phosphor, the surface of the wavelength conversion member 40 may be coated with a resin material with a low gas permeability and the like for the purpose of reducing degradation of the phosphor due to the oxidation.

First Reflective Member 50, Second Reflective Member 52, Light-Shielding Member 36

The first and second reflective members 50 and 52 are formed of material that reflects the light from the light-emitting element 20, and thus can be formed, for example, of a resin containing a reflective material. Examples of the resin suitable for use in the first and second reflective members 50 and 52 can include a dimethyl silicone resin, a phenyl silicone resin, a dimethyl/phenyl hybrid silicone resin, an epoxy/silicone hybrid resin, a fluorine resin, an adamantane resin, an alicyclic epoxy resin, a hybrid epoxy resin, and a urethane resin. Examples of the reflective material include titanium oxide, zinc oxide, titanium dioxide, silicon dioxide, zirconium dioxide, potassium titanate, alumina, aluminum nitride, boron nitride, mullite, niobium oxide, barium sulfate, carbon black, various kinds of rare-earth oxides (e.g., yttrium oxide, gadolinium oxide). The first reflective member 50 and the second reflective member 52 may contain a diffusing agent, a colorant, and the like.

Suitable materials for the light-shielding member 36 can include, in addition to the materials for the first and second reflective members 50 and 52, carbon black, and metal nanoparticles, such as Ag nanoparticles or AgSn nanoparticles.

Light-Emitting Component 10

The light-emitting component 10 can include the base 15, the light-emitting element 20, and the reflective member 29. The base 15 is, for example, an insulating support base made of ceramic (e.g. Al$_2$O$_3$, AlN) or the like, with wirings formed thereon; and a combination of a resin (e.g. a phenol resin, an epoxy resin, a polyimide resin, a bismaleimide triazine (BT) resin, a polyphthalamide (PPA)) and a lead frame.

The light-emitting element 20 for use can be a semiconductor light-emitting element that includes the growth substrate 27, the semiconductor layer 28 containing a light-emitting layer, and a pair of electrode layers provided on the same surface. For example, a nitride semiconductor light-emitting element that emits blue light can be used as the light-emitting element 20. The growth substrate 27 utilizes a light transmissive material that can grow the semiconductor layer 28. Examples of the growth substrate 27 can include an insulating substrate made of sapphire or spinel (MgAl$_2$O$_4$); silicon carbide (SiC), ZnS, ZnO and diamond; and an oxide substrate made of lithium niobate or neodymium gallate. As mentioned above, the light-emitting element 20 may not always include the growth substrate 27.

Light Transmissive Resin 60

Examples of the light transmissive resin 60 that fills the gap between the light-emitting element 20 and the light guide plate 30 for use can include resin materials such as a dimethyl silicone resin, a phenyl silicone resin, a dimethyl/phenyl hybrid silicone resin, an epoxy/silicone hybrid resin, a fluorine resin, an adamantane resin, an alicyclic epoxy resin, a hybrid epoxy resin, and a urethane resin, polycarbonate (PC), polymethyl methacrylate (PMMA), and the like. In particular, a silicone resin is preferable in terms of heat resistance, light resistance, and high translucency of light.

While some embodiments according to the present invention have been illustrated above, it is apparent that the present invention is not limited to the above-mentioned embodiments and can have any form without departing from the scope of the present invention.

What is claimed is:

1. A lighting device, comprising:
   a light-emitting component including at least one light-emitting element mounted on a base;
   a light guide plate guiding light emitted from the light-emitting element;
   a wavelength conversion member partially covering the light guide plate; and
   a first reflective member covering the wavelength conversion member, wherein
   the light guide plate comprises a light-extraction surface allowing light emitted from the light-emitting element to exit and a rear surface opposite to the light-extraction surface,
   at least one recess is formed on an edge region of one of the light-extraction surface and the rear surface,
   the wavelength conversion member partially covers one of the light-extraction surface and the rear surface that does not include the recess, and
   the light-emitting element is accommodated in the recess such that a light-emitting surface of the light-emitting element faces the wavelength conversion member.

2. The lighting device according to claim 1, wherein
   the light guide plate further comprises a plurality of end surfaces positioned between the light-extraction surface and the rear surface, and
   the recess is opened at one of the end surfaces.

3. The lighting device according to claim 1, further comprising a gap between the light-emitting surface of the light-emitting element and the light guide plate is filled with a light transmissive resin.

4. The lighting device according to claim 1, wherein a lateral surface of the recess of the light guide plate is covered with a light-shielding member.

5. The lighting device according to claim 1, wherein the light-emitting component includes a plurality of light-emitting elements,
   the light guide plate comprises a plurality of recesses, and each of the light-emitting elements is accommodated in each of the recesses.

6. The lighting device according to claim 1, wherein the light guide plate further comprises a plurality of end surfaces positioned between the light-extraction surface and the rear surface,
the light-emitting component is disposed adjacent to at least one of the plurality of end surfaces, and
the reflective member covers the at least one of the plurality of end surfaces.

7. The lighting device according to claim 1, wherein the light guide plate further comprises a plurality of end surfaces positioned between the light-extraction surface and the rear surface,
the light-emitting component is disposed adjacent to at least one of the plurality of end surfaces, and
a width of the light emitting element is set larger than a thickness of the light guide plate at the at least one of the plurality of end surfaces.

8. The lighting device according to claim 1, wherein the light-emitting element is a semiconductor light-emitting element without a growth substrate.

9. The lighting device according to claim 1, wherein at least one lateral surface of the light-emitting element is covered with a reflective member.

10. The lighting device according to claim 1, wherein the wavelength conversion member covers the edge region of the light-extraction surface of the light guide plate, and
the lighting device further comprises a second reflective member covering the rear surface of the light guide plate.

11. The lighting device according to claim 1, wherein the wavelength conversion member covers the edge region of the rear surface of the light guide plate, and
the first reflective member extends to a region of the rear surface exposed from the wavelength conversion member.

12. The lighting device according to claim 1, wherein the edge region covered with the wavelength conversion member includes an inclined surface in the edge region of the light guide plate.

13. A lighting device, comprising:
a light-emitting component including at least one light-emitting element mounted on a base;
a light guide plate guiding light emitted from the light-emitting element;
a wavelength conversion member partially covering the light guide plate; and
a first reflective member covering the wavelength conversion member, wherein
the light guide plate comprises a light-extraction surface allowing light emitted from the light-emitting element to exit and a rear surface opposite to the light-extraction surface,
the light-emitting element is embedded in an edge portion of the light guide plate such that a light-emitting surface of the light-emitting element faces an edge region of one of the light-extraction surface and the rear surface, and
the wavelength conversion member partially covers one of the light-extraction surface and the rear surface that does not embed the light-emitting element such that a light-emitting surface of the light-emitting element faces the wavelength conversion member.

14. A method for manufacturing a lighting device, comprising:
providing a light-emitting component including at least one light-emitting element mounted on a base;
providing a light guide plate comprising a light-extraction surface and a rear surface opposite to the light-extraction surface, at least one recess being formed in an edge region of one of the light-extraction surface and the rear surface;
assembling the light-emitting component and the light guide plate such that the light-emitting element is accommodated in the recess of the light guide plate and a light-emitting surface of the light-emitting element faces one of the light-extraction surface and the rear surface that does not include the recess;
disposing a wavelength conversion member, such that the wavelength conversion member faces the light-emitting surface of the light-emitting element and covers at least a part of an edge region of one of the light-extraction surface and the rear surface that does not include the recess; and
disposing a first reflective member to cover the wavelength conversion member.

15. The method for manufacturing the lighting device according to claim 14, wherein, in the step of disposing the wavelength conversion member, the wavelength conversion member is formed by a spray method.

16. The method for manufacturing the lighting device according to claim 14, wherein, in the step of disposing the reflective member, the reflective member is formed by a spray method.

* * * * *